(12) United States Patent
Gunn, III et al.

(10) Patent No.: US 7,006,732 B2
(45) Date of Patent: Feb. 28, 2006

(54) POLARIZATION SPLITTING GRATING COUPLERS

(75) Inventors: Lawrence C. Gunn, III, Encinitas, CA (US); Thierry J. Pinguet, Pasadena, CA (US); Maxime J. Rattier, Paris (FR); Jeremy Witzens, Pasadena, CA (US)

(73) Assignee: Luxtera, Inc., Carlsbad, CA (US)

( * ) Notice: Subject to any disclaimer, the term of this patent is extended or adjusted under 35 U.S.C. 154(b) by 27 days.

(21) Appl. No.: 10/734,374

(22) Filed: Dec. 12, 2003

(65) Prior Publication Data

US 2004/0184156 A1 Sep. 23, 2004

Related U.S. Application Data

(60) Provisional application No. 60/456,381, filed on Mar. 21, 2003.

(51) Int. Cl.
  G02B 6/34 (2006.01)
  G02B 6/26 (2006.01)
  G02B 6/42 (2006.01)

(52) U.S. Cl. ............................ 385/37; 385/14; 385/50; 359/629

(58) Field of Classification Search ................. 385/14, 385/27, 31, 37, 49, 129–131; 359/629, 631, 359/639
See application file for complete search history.

(56) References Cited

U.S. PATENT DOCUMENTS

| | | | | |
|---|---|---|---|---|
| 5,208,800 A | * | 5/1993 | Isobe et al. | 369/112.27 |
| 5,420,947 A | * | 5/1995 | Li et al. | 385/37 |
| 5,625,729 A | * | 4/1997 | Brown | 385/31 |
| 5,835,643 A | * | 11/1998 | Fukumoto et al. | 385/7 |
| 6,259,841 B1 | * | 7/2001 | Bhagavatula | 385/47 |
| 6,640,034 B1 | * | 10/2003 | Charlton et al. | 385/122 |
| 6,788,847 B1 | * | 9/2004 | Paddon et al. | 385/31 |
| 2002/0008215 A1 | * | 1/2002 | Evans | 250/559.13 |
| 2002/0146193 A1 | * | 10/2002 | Hamada | 385/15 |
| 2003/0228096 A1 | * | 12/2003 | Parker et al. | 385/27 |
| 2003/0235370 A1 | * | 12/2003 | Taillaert et al. | 385/50 |

* cited by examiner

Primary Examiner—Akm Enayet Ullah
Assistant Examiner—Daniel Petkovsek
(74) Attorney, Agent, or Firm—Fernandez & Associates, LLP (57) ABSTRACT

A polarization splitting grating coupler (PSGC) connects an optical signal from an optical element, such as a fiber, to an optoelectronic integrated circuit. The PSGC separates a received optical signal into two orthogonal polarizations and directs the two polarizations to separate waveguides on an integrated circuit. Each of the two separated polarizations can then be processed, as needed for a particular application, by the integrated circuit. A PSGC can also operate in the reverse direction, and couple two optical signals from an integrated circuit to two respective orthogonal polarizations of one optical output signal sent off chip to an optical fiber.

37 Claims, 6 Drawing Sheets

POLARIZATION SPLITTING GRATING COUPLERS

CROSS-REFERENCE TO RELATED APPLICATIONS

This application claims priority from U.S. Provisional application No. 60/456,381 filed Mar. 21, 2003.

FIELD OF THE INVENTION

The present invention relates to an apparatus for facilitating the connection of optical signals from optical fibers to optoelectronic integrated circuits.

BACKGROUND OF THE INVENTION

Optical fibers have been widely used for the propagation of optical signals, especially to provide high speed communications links. Optical links using fiber optics have many advantages compared to electrical links: large bandwidth, high noise immunity, reduced power dissipation and minimal crosstalk. Optical signals carried by optical fibers are processed by a wide variety of optical and optoelectronic devices, including integrated circuits. Optical communications signals in optical fibers are typically in the 1.3 $\mu$m and 1.55 $\mu$m infrared wavelength bands. Optoelectronic integrated circuits made of silicon are highly desirable since they can be fabricated at low cost in the same foundries used to make VLSI integrated circuits. The optical properties of silicon are well suited for the transmission of optical signals, due to its transparency in the infrared wavelength bands of 1.3 $\mu$m and 1.55 $\mu$m and its high refractive index. As a result, low loss planar silicon optical waveguides have been successfully built in silicon integrated circuits.

Optical signals traveling in optical fiber frequently need to be coupled to optoelectronic circuits and this can be done through a variety of known techniques and devices. Once an optical signal is on a chip, it can be processed either as an optical signal or converted to an electronic signal for further processing.

The flat end of an optical fiber can be directly connected to the edge of an integrated circuit, so an optical signal can be coupled to a flat end of an integrated waveguide, but the fiber and the waveguide have different cross sectional geometries and are very different in size.

An optical signal in a fiber can be coupled to a waveguide through the top surface of an integrated circuit using a waveguide grating coupler, which is more effective as a fiber to chip connector. But there are difficulties in connecting an optical signal from a fiber to a waveguide using a waveguide grating coupler, due to differences in: cross sectional geometry, the number of optical modes and polarization characteristics.

A circular cross section with a core diameter of less than ten microns is typical for a single mode fiber (SMF). A nanophotonic waveguide is typically rectangular in cross section and can be substantially smaller than one micron in both cross sectional dimensions. A waveguide grating coupler can be designed to make a usable connection between a fiber and a waveguide, even with their inherently different cross sectional and size characteristics.

A typical SMF fiber can have a gaussian mode profile, with most of the power concentrated in the center of the light beam. A waveguide can be designed to support a gaussian type of mode profile with most of the power in the center of the waveguide. A waveguide grating coupler can provide a usable connection between a fiber and a waveguide, if they have compatible gaussian mode profiles.

A waveguide grating coupler can be designed to connect a fiber to a waveguide, even when a fiber and a waveguide have very different cross sectional, size and mode profile characteristics. But connecting an optical signal from a fiber to a waveguide can cause significant signal loss and distortion due to the typically different and incompatible polarization characteristics.

An optical beam traveling in a single mode fiber (SMF) with circular cross section can typically be decomposed over an arbitrary basis of two orthogonal polarizations. These two orthogonal polarizations have approximately the same propagation constant and approximately the same group velocity in an optical fiber. Some refer to these two modes as a single mode with two polarization components. Within this discussion of the present invention, the two orthogonal polarizations are referred to as two modes.

In theory and under ideal conditions, there is no exchange of power between the orthogonal polarizations in an SMF fiber. If an optical signal is directed into only one polarization, then all the power should remain in that polarization. But in actual practice, imperfections or strains in the fiber cause random power transfer between the two polarizations. The total power is thus divided between the two polarizations, and this may not be a problem in some applications, but in many situations, this can be a major problem. In some cases, there can be a great deal of fluctuation and power transfer between the two polarizations. Such random fluctuations can cause the power delivered on one polarization, to be close to zero, which would result in considerable loss of signal, if only that polarization is being received by a waveguide on a chip.

Similarly, two orthogonal polarization modes are present in standard forms of polarization maintaining fibers. These two modes have sufficiently different phase and group velocities to prevent light from coupling back and forth between the two modes. But a typical waveguide cannot usually propagate both of the modes, which would result in some signal loss in such a fiber to waveguide connection.

Typical integrated optical waveguides have a different type of modal configuration, where there are two primary types of modes: the transverse electric (TE) and the transverse magnetic (TM), which describe which field of the mode is oriented purely transversely to the direction of propagation. This is strictly true only for two dimensional ideal waveguides, however this naming convention is also used for real world three dimensional waveguides, which are only approximately TE or TM. Future references herein will make the common assumption that quasi-TE or quasi-TM modes are understood as TE or TM modes. A waveguide grating coupler can be designed to connect one polarization of an optical signal from a fiber to only one of the TE or TM modes. The other orthogonal polarization of the optical signal in the fiber would not be connected to the waveguide and any information transported by that polarization would be lost.

As a result of the differences in polarization characteristics between fibers and waveguides, it has been difficult to connect optical signals from one to the other.

SUMMARY OF THE INVENTION

One embodiment of the present invention is a polarization splitting grating coupler (PSGC), which provides a means for connecting an optical signal from an optical fiber to an optoelectronic integrated circuit. The PSGC separates a received optical signal into two orthogonal polarizations and directs the two polarizations to separate waveguides on an integrated circuit. Each of the two separated polarizations can then be processed, as needed for a particular application, by the integrated circuit. A PSGC can also operate in the reverse direction, and couple two optical signals from an integrated circuit to two respective orthogonal polarizations of one optical output signal sent off chip to an optical fiber.

DETAILED DESCRIPTION

Figure 1:
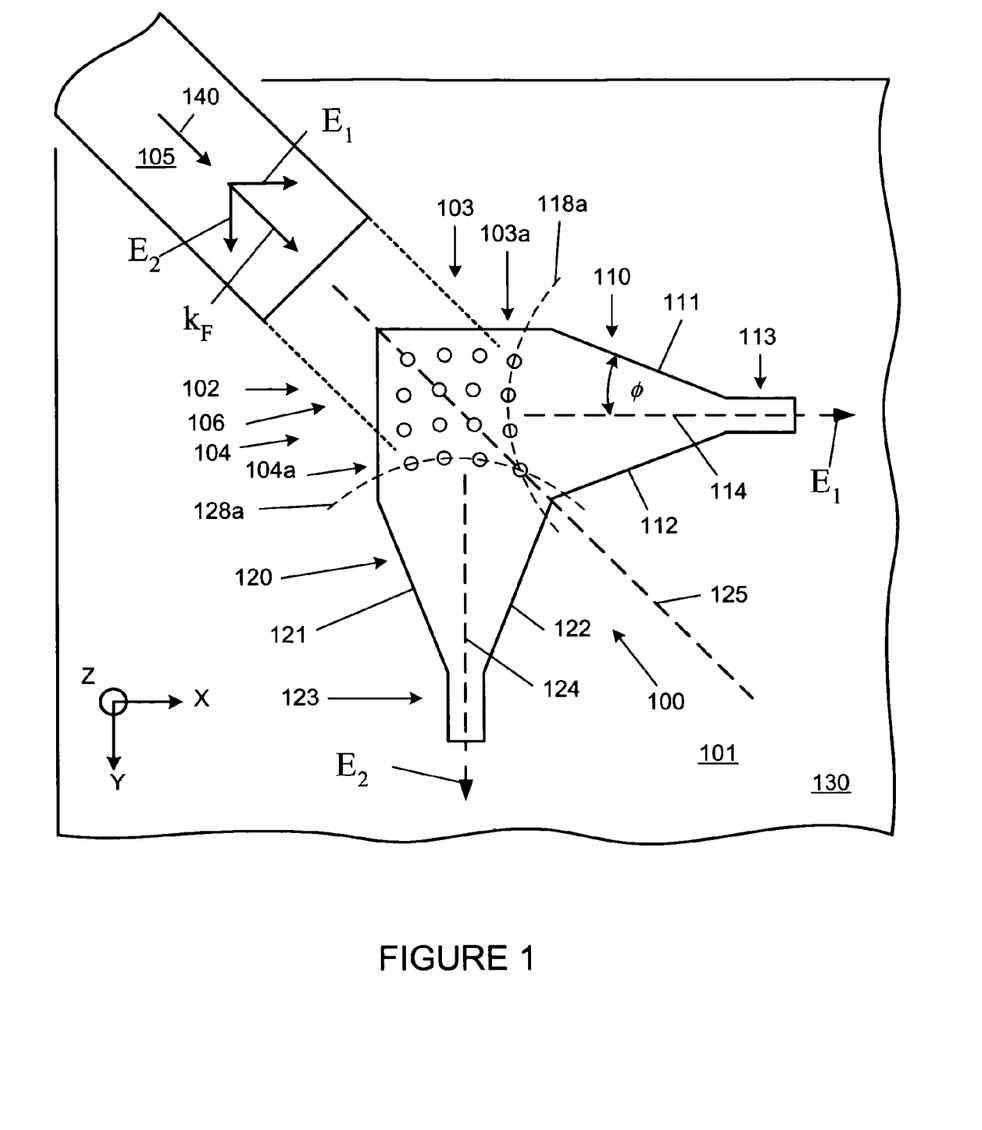
FIG. 1 is a top view of an integrated polarization splitting waveguide grating coupler, according to one embodiment of the present invention.

FIG. 1 is a top view of an integrated polarization splitting waveguide grating coupler, not to scale, according to one embodiment of the present invention. Polarization splitting grating coupler (herein "PSGC") 100 is part of integrated circuit 101, which has been built on substrate 130. PSGC 100 connects light between optical element 105 and integrated circuit 101. In FIG. 1, optical element 105, such as an optical fiber, has been shown above and off to the side of integrated circuit 101 and thus is not intended to provide a figure of a system during operation. PSGC 100 includes cross grating 102, flared waveguides 110 and 120 and linear waveguides 113 and 123. Waveguides 113 and 123 connect optical signals to waveguides or other optical devices, not shown, on integrated circuit 101. The cross grating 102 includes many light scattering elements 106. The substrate 130 can be made of any of a variety of substrates such as: silicon, silicon on insulator (SOI), silicon on sapphire (SOS), silicon on nothing (SON) or a five layer substrate made of three layers of silicon with dielectric layers in between.

The various waveguides in PSGC 100, such as flared waveguides 110 and 120, linear waveguide 113 and 123 and the waveguide portion of cross grating 102 are typically all fabricated of the same type of optical waveguide, which can include any one of the following: a strip loaded waveguide, a channel waveguide, a rib waveguide and a ridge waveguide. A strip loaded waveguide can be fabricated of a strip, a slab and a low index transition layer between the strip and the slab. The cross grating 102 and PSGC 100 in their structure and operation can be understood as integrated waveguides disposed on substrate 130 and can be fabricated as one or a combination of the above mentioned types of waveguides.

The relatively small number of light scattering elements 106 shown in FIG. 1 is merely illustrative and is not intended as limiting the number of light scattering elements in PSGC 100. A PSGC 100 can typically have hundreds or even thousands of light scattering elements 106. The light scattering elements 106 are positioned at the intersections of two sets of equally spaced rows 103 and 104, which in preferred embodiments are approximately orthogonal or nearly orthogonal to each other. Curved row 103a is an exemplary row of the set of rows 103 with concave sides facing waveguides 110 and 113. Curved row 104a is an exemplary row of the set of rows 104 with concave sides facing waveguides 120 and 123. The rows 103 and 104 are curved and in preferred embodiments are equally spaced and elliptically or nearly elliptically curved. In other embodiments, the rows 103 and 104 can have other curvatures, such as those described by quadratic, hyperbolic, quartic or other mathematical functions.

The positioning of the elements 106 in exemplary rows 103a and 104a is defined by curved lines, such as exemplary lines 118a and 128a. In some preferred embodiments, the spacing between the rows is uniform and the spacing between the elements in a row is also uniform. In some preferred embodiments, some of the light scattering elements are not positioned at the intersections of the curved rows 103 and 104 as defined by curved lines, such as curved lines 118a and 128a.

The many light scattering elements 106 arranged in intersecting rows can be any of a variety of shapes and sizes, such as: a hole, a cylinder, a pillar, a conic section, a cube, a pyramid, a prism or a polyhedron. The light scattering elements can be formed in the substrate or on top of the substrate.

The light scattering elements can be made of materials such as silicon or silicon dioxide. In other embodiments, the light scattering elements can include elements made of semiconductor materials, dielectric materials and multi-layer structures made of a combination of semiconductor and dielectric layers. The light scattering elements 106 can be blazed at an angle which can be normal to the surface or at an angle to the surface of the integrated circuit 101.

In other embodiments, the rows 103 and 104 of light scattering elements are not evenly spaced and the dimensions of the scatterers and the spacing between the scatterers within a row can be irregular and vary as may be needed for a particular application.

In other embodiments, the spacing between the curved rows may or may not fit a pattern, and the variation in the spacing between the rows can be: periodic, linear, uniform or as defined by a non-linear mathematical function.

In other embodiments, the light scattering elements can be made of various sizes, where a variation in one of the dimensions of the light scattering elements may or may not fit a pattern, and the variation in the dimensions can be: periodic, linear, uniform or as defined by a non-linear mathematical function.

In other embodiments, the spacing of the light scattering elements within any row may or may not fit a pattern, and the variation in the spacing can be: periodic, linear, uniform or as defined by a non-linear mathematical function.

In other embodiments, the characteristics of the light scattering elements that can vary include: width, height, length, spacing, depth, angle to the normal and index of refraction.

Elliptical rows 103 are positioned with their concave sides facing the flared waveguide 110. The flared waveguide 110 includes curved sidewalls 111 and 112. Curved sidewalls 111 and 112 confine light in a transverse direction and support the propagation of light along the axis of propagation 114. Curved sidewalls 111 and 112 are curved to support the guided propagation of, non-planar, i.e., circularly cylindrical wavefronts in the flared waveguide 110.

Elliptical rows 104 are positioned with their concave sides facing flared waveguide 120. The flared waveguide 120 includes curved sidewalls 121 and 122. Sidewalls 121 and 122 confine light in a transverse direction and support the propagation of light along the axis of propagation 124. Sidewalls 121 and 122 are curved to support the guided propagation of circularly cylindrical wavefronts in the flared waveguide 120.

In other embodiments, the sides of elliptical rows 103 and 104 that face respective flared waveguides 110 and 120 can have other shapes, such as: convex, straight or irregular.

In preferred embodiments, the curved sidewalls 111, 112, 121 and 122 are substantially hyperbolically curved, and in alternate embodiments, the sidewalls can be defined by an elliptic curve, a parabolic curve, a quartic curve or other mathematical function The axis of propagation 114 of flared waveguide 110 is at an angle with respect to the axis of propagation 124 of flared waveguide 120. In preferred embodiments, the angle between the flared waveguides is 90 degrees or close to 90 degrees.

The flared waveguides 110 and 120 are identical in shape and dimensions to each other and the following discussion with regard to waveguide 110 also pertains to waveguide 120. Flared waveguide 110 can flare out at an arbitrary angle, but a flare angle Φ (half angle) is preferably selected to accommodate the in-plane "numerical aperture" of linear waveguide 113. If this condition is substantially satisfied, the light in the evanescent field of the diverging beam can be substantially coupled into the optical element 105 or the waveguide 113 depending on the direction of propagation. The flare angle Φ may range from approximately 0 to 60° although the angle should not be limited to this range of values. In one preferred embodiment, the flare angle Φ is selected to be approximately 15 degrees to accommodate the numerical aperture of one type of linear waveguide 113.

Flared waveguides 110 and 120 operate as focusing horns by focusing the respective two outputs of cross grating 102 to linear waveguides 113 and 123. Flared waveguides 110 and 120 can also be considered to operate as mode converters by converting the modal characteristics of the respective two outputs of cross grating 102 to linear waveguides 113 and 123. Flared waveguides 110 and 120 can also be considered to operate as spot size reducers by converting the relatively larger cross sectional size of the respective two outputs of cross grating 102 to the relatively smaller cross sectional size of the linear waveguides 113 and 123.

PSGC 100 connects an optical element 105 and an optoelectronic integrated circuit 101 using three input/output ports: two in the plane of the substrate 130 and one at an angle to the plane of the substrate 130. If an optical input is connected to the cross grating 102 from an off-chip optical element 105, then two outputs are directed to the outputs of the cross grating 102. In FIG. 1, the two outputs of the cross grating are connected to respective flared waveguides 110 and 120 and linear waveguides 113 and 123.

If two optical inputs are connected to the in-plane ports of cross grating 102 via linear waveguides 113 and 123 and flared waveguides 110 and 120, then one optical output is propagated out of the cross grating 102 and off-chip to an optical element 105.

PSGC 100 connects optical signal 140 from an optical element 105, to optical devices, such as waveguides, on integrated circuit 101. Waveguides 113 and 114 connect the outputs of PSGC 100 to waveguides or other optical devices, not shown, on integrated circuit 101. Optical elements 105 can be optical sources, such as: a laser, a light emitting diode or another grating coupler, or transmission media such as an optical fiber or a lens. Optical elements can include photodetectors, which accept optical signals from PSGC 100 operating as an optical combiner. Optical signal 140 can be directed to the PSGC 100 at a normal or preferably nearly normal angle with respect to the integrated circuit 101. An angle other than normal is preferred since it reduces the generation of reflections from the surface of integrated circuit 101.

A preferred angle for connecting an optical fiber to PSGC 100 is less than ten degrees to the normal. It is preferable to position an optical fiber in the near field of the light scattering elements. It is preferable to position light scattering elements within the Rayleigh range of the end of the optical fiber.

PSGC 100 provides a connection from an optical element 105, such as an optical fiber to integrated waveguides on an optoelectronic integrated circuit. One of the difficulties in making such a connection is the difference in cross sectional geometry. An optical fiber typically has a diameter of less than 10 microns, while an integrated waveguide can have a rectangular cross section with a width and height measured in nanometers. A waveguide grating coupler, such as PSGC 100 can make the transition in shape and size.

Cross grating 102 accepts as input a light beam with plane wavefronts from an optical fiber. The light scattering elements 106 accept the light with plane wavefronts and convert the plane wavefronts to non-planar wavefronts, which are then directed to either of the two flared waveguides 110 and 120, depending on their polarizations. The two flared waveguides 110 and 120 have flared and preferably hyperbolically curved sides to accommodate circularly cylindrical wavefronts of light propagating through them.

At the narrow ends of the flared waveguides 110 and 120, the circularly cylindrical wavefronts of light are converted to planar wavefronts by the hyperbolically shaped sides and are output to the connected linear waveguides 113 and 123. Linear waveguides 113 and 123 can be in the nanophotonic size range. The design of the cross grating 102, especially the elliptical curvature of the rows of light scattering elements 106 can provide for the conversion of planar wavefronts to non-planar wavefronts.

The light in a typical SMF optical fiber can have a gaussian intensity profile and the design of the cross grating 102 can provide for accepting light with a gaussian intensity profile from a fiber.

PSGC 100 can also connect light traveling in the opposite direction, such as coupling two input light beams to two orthogonal polarizations into one optical signal sent to an optical fiber. Two in-phase orthogonal polarizations can be combined together into one output signal, without any destructive interference between the two polarizations. In such applications, flared waveguides 110 and 120 make the size transition from the typically much smaller waveguides on an integrated circuit. The flared waveguides 110 and 120 can propagate the light as non-planar wavefronts, such as circularly cylindrical wavefronts to the cross grating 102, which can combine the two optical signals into one optical signal. Cross grating 102 can accept two input light beams with non-planar wavefronts and then output the combined light beam with planar wavefronts to an optical fiber. The design of the cross grating 102, especially the arrangement of the light scattering elements 106 can provide for the conversion of non-planar wavefronts to planar wavefronts.

The light in a typical SMF fiber can have a gaussian intensity profile and the design of the cross grating 102 can provide for scattering light with a gaussian intensity profile up to an optical fiber.

Optical signal 140 can couple to the grating coupler 102 at an azimuth of 45 degrees, so that the optical signal is spread out equally on both sides of the axis of symmetry 125 of the cross grating 102.

Optical signal 140 may contain one or more polarizations, which are represented by vectors $E_1$ and $E_2$, which are orthogonal to each other. PSGC 100 separates the two polarizations $E_1$ and $E_2$ that can be in optical signal 140, and directs the two polarizations to the two flared waveguides 110 and 120. The flared waveguides 110 and 120 focus each of the respective outputs of cross grating 102 to linear waveguides 113 and 123. Polarization $E_1$ propagates to the output of linear waveguide 113. Polarization $E_2$ propagates to the output of linear waveguide 123.

After their separation in the cross grating 102, the propagation of each of the two polarizations $E_1$ and $E_2$ of optical signal 140 within the rest of PSGC 100 is substantially identical. The flared waveguides 110 and 120 are substantially identical in fabrication and operation. The linear waveguides 113 and 123 are substantially identical in fabrication and operation.

The separated polarizations $E_1$ and $E_2$ at the two outputs of cross grating 102 can be coupled to respective TE modes in two waveguides, or to respective TM modes in two waveguides or to a TE mode and a TM mode in two waveguides, as may be needed for a particular application.

The two separated polarizations $E_1$ and $E_2$ at the two outputs of cross grating 102 can be processed by any of a variety of optoelectronic systems, as may be needed for a particular application. An example of systems for the processing of separated polarizations of an optical signal are discussed in U.S. patent application Ser. No. 10/600,804 entitled "Integrated Dual Waveguides" filed on Jun. 19, 2003, which is incorporated herein by reference.

A PSGC according to the present invention can be understood as two superimposed waveguide grating couplers, where the two gratings are at ninety degrees to each other. An example of a one dimensional waveguide grating coupler is discussed in U.S. Patent application No. 60/446,842 entitled "Optical Waveguide Grating Coupler" filed on Feb. 11, 2003, which is incorporated herein by reference.

Figure 2:
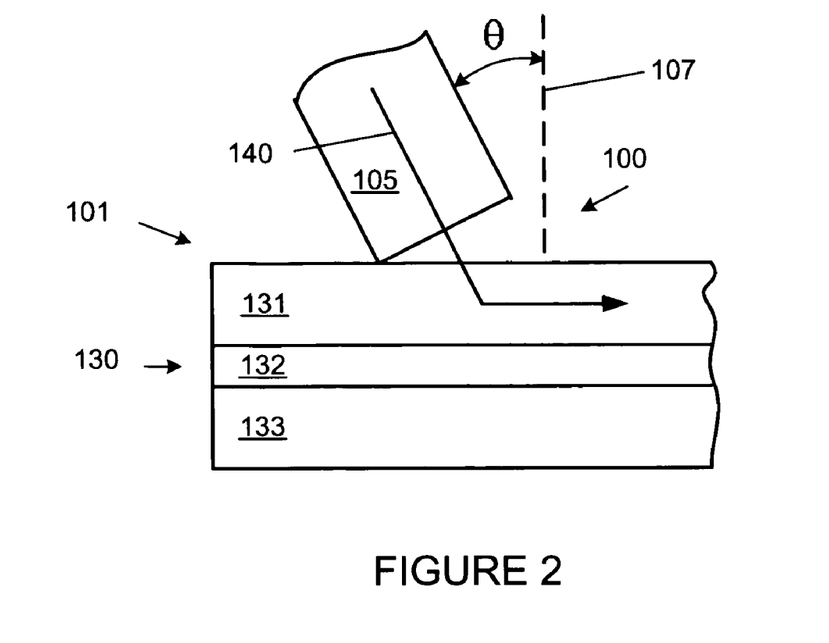
FIG. 2 is a side view of an optical fiber connecting to an integrated circuit through a polarization splitting grating coupler, according to one embodiment of the present invention.

FIG. 2 is a side view, not to scale, of an optical fiber connecting to an integrated circuit through a PSGC, according to one embodiment of the present invention. PSGC 100 is part of integrated circuit 101 fabricated on substrate 130, which is a SOI substrate, made of layers 131, 132 and 133. Layer 131 is made of monocrystalline silicon. Layer 132 is made of dielectric material, such as silicon dioxide. Layer 133 is made of monocrystalline silicon.

Optical fiber 105 connects to the substrate 130 at an angle θ with the normal, where the normal is shown by line 107. Optical signal 140 in fiber 105 is coupled to integrated circuit 101 by PSGC 100. Light scattering elements, not shown, in layer 131 of the PSGC 100 connect optical signal 140 to an integrated waveguide, not shown, and directs the optical signal 140 into integrated circuit 101. In preferred embodiments, the angle θ is greater than zero degrees and less than ten degrees. As discussed with regard to FIG. 1, PSGC 100 can also operate in the reverse direction by coupling an optical signal from integrated circuit 101 to fiber 105.

Figure 3:
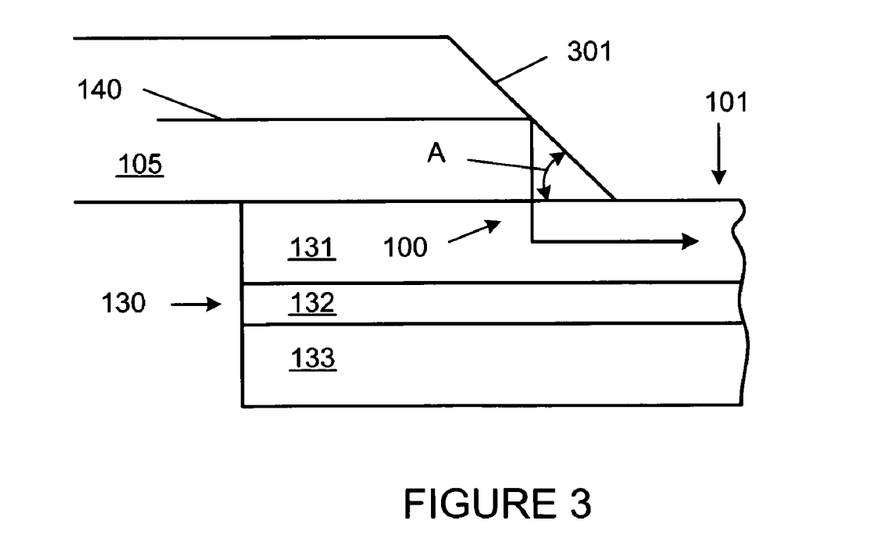
FIG. 3 is a side view of an optical fiber connecting to an integrated circuit through a polarization splitting grating coupler, according to an alternate embodiment of the present invention.

FIG. 3 is a side view, not to scale, of an optical fiber connecting to an integrated circuit through PSGC 100, according to an alternate embodiment of the present invention. PSGC 100 is part of integrated circuit 101 fabricated on substrate 130, which is a SOI substrate, made of layers 131, 132 and 133, as discussed previously with regard to FIG. 2. Optical fiber 105 is lying on integrated circuit 101 and has its end 301 cut and polished at an angle A.

Optical signal 140 is reflected off the inside surface of the cut end 301 of fiber 105. The angle A of the cut end 301 of fiber 105 can be cut at an angle of 45 degrees, and angle A is preferably less than or greater than 45 degrees to reduce the generation of reflections at the surface of integrated circuit 101. Optical signal 140 in fiber 105 is coupled to integrated circuit 101 by PSGC 100. Light scattering elements, not shown, in layer 131 of the PSGC 100 connects the optical signal 140 to an integrated waveguide, not shown, and directs the optical signal 140 into integrated circuit 101. As discussed with regard to FIG. 1, PSGC 100 can also operate in the reverse direction by coupling an optical signal from integrated circuit 101 to fiber 105.

PSGC 100 of the present invention can be designed to work with not only the coupled fiber modes from the cut end of an optical fiber as in FIG. 2, but also with diverging or modified fiber modes, such as those emerging from a fiber running parallel to a chip and cut and polished at an angle, such as the one shown in FIG. 3. PSGC 100 can be designed to couple a diverging beam of light with a non-planar wavefront such as from a lens above the grating. PSGC 100 can also be designed to couple a converging beam of light with a non-planar wavefront from an optoelectronic integrated circuit 101 to an optical element such as a lens or photodetector a short distance above the integrated circuit.

Figure 4:
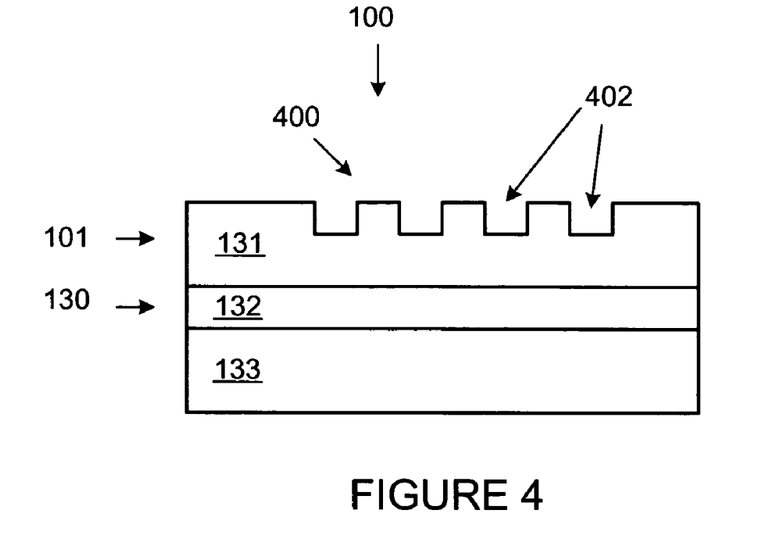
FIG. 4 is a side view of an integrated polarization splitting grating coupler, according to one embodiment of the present invention.

FIG. 4 is a side view, not to scale, of a section of a PSGC 100, according to one embodiment of the present invention. PSGC 100 is part of integrated circuit 101 fabricated on substrate 130, which is a SOI substrate, made of layers 131, 132 and 133. Cross grating 400 is made of many light scattering elements 402 etched in the top layer 131 of integrated circuit 101.

Figure 5:
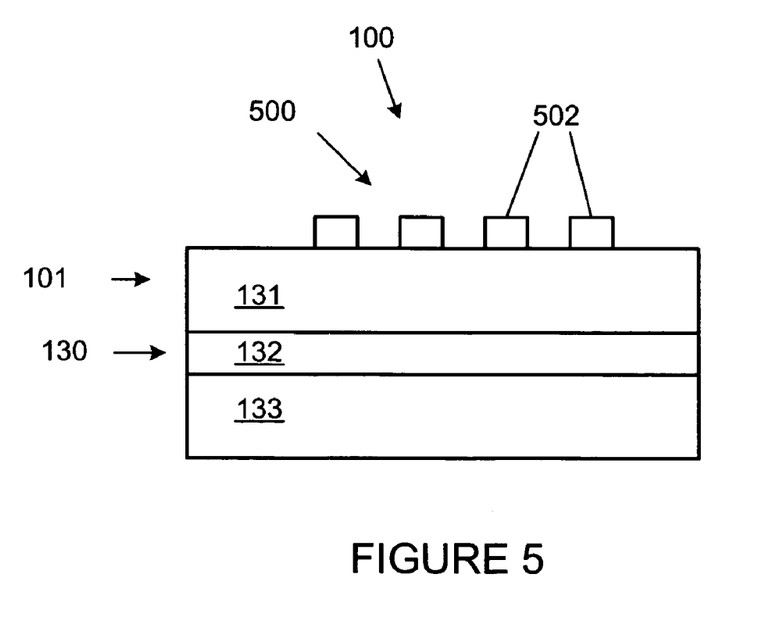
FIG. 5 is a side view of an integrated polarization splitting grating coupler, according to an alternate embodiment of the present invention.

FIG. 5 is a side view, not to scale, of a section of a PSGC 100, according to one embodiment of the present invention. PSGC 100 is part of integrated circuit 101 fabricated on substrate 130, which is a SOI substrate, made of layers 131, 132 and 133. Cross grating 500 is made of many light scattering elements 502 disposed on top of layer 131 of integrated circuit 101.

More examples of various types of light scattering elements are discussed in U.S. patent application Ser. No. 10/606,297 entitled "Integrated Optical and Electronic Devices" filed on Jun. 24, 2003, which is incorporated herein by reference.

Figure 6:
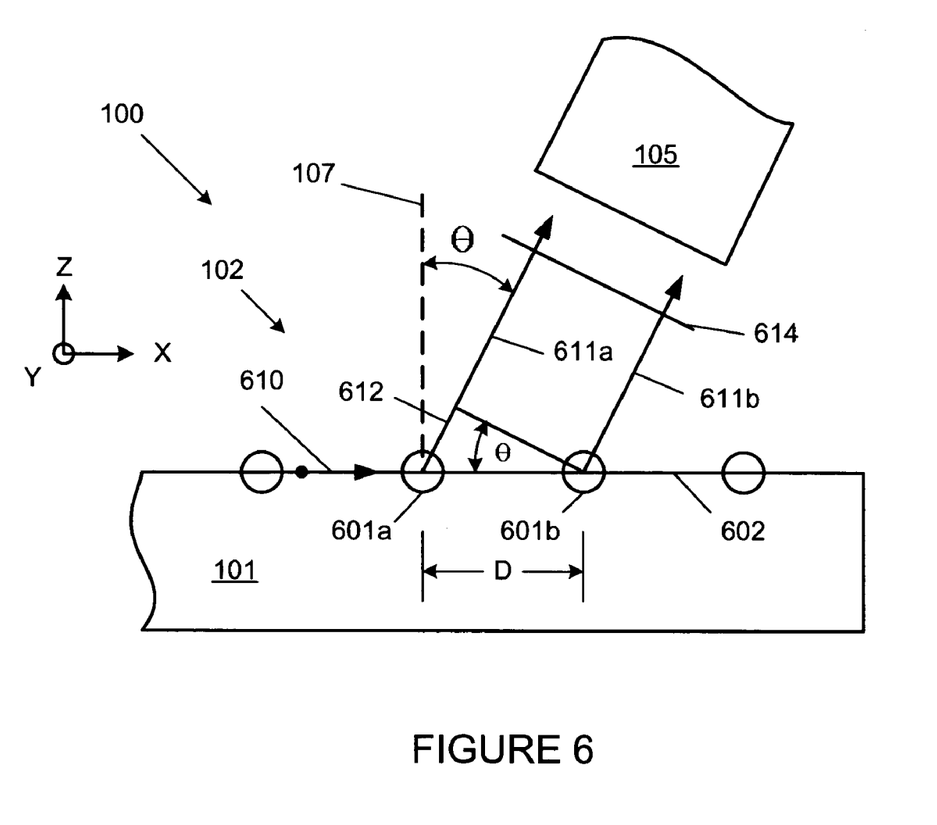
FIG. 6 schematically illustrates scattering of light that encounters a series of longitudinally spaced light scattering elements, according to one embodiment of the present invention.

FIG. 6 schematically illustrates, not to scale, the scattering of light along the x axis due to a series of longitudinally spaced light scattering elements, according to one embodiment of the present invention. FIG. 6 shows one section, along one axis of propagation, of cross grating 102 of PSGC 100 described previously and part of integrated circuit 101. Two exemplary light scattering elements 601a and 601b are positioned longitudinally along a line 602 (in the x direction) along with other light scattering elements.

Above the cross grating 102, optical element 105 is positioned at an angle θ to the normal 107. These scatterers may correspond, for example, to the light scattering elements 106 of the cross grating 102 described previously. A normal line 107, in the z direction, is perpendicular to the line 602 of scatterers 601a, b. As a wave 610 travels along the line 602, it successively encounters the scatterers 601a and 601b. At each scatterer, portions of the wave 610 scatter in many directions. Two such scattered waves are depicted as parallel rays 611a and 611b directed at an angle θ with respect to the normal direction 107 and propagating in the direction of optical element 105. As is generally understood, a difference in path length 612 between the two rays 611a and 611b, from their respective scatterers 601a and 601b to a given perpendicular to the rays, i.e., line 614, can be expressed as D sin θ, where D is the spacing between the scatterers 601a and 601b. If the scatterers 601a, b are sources that emit waves in phase, a coherent wavefront is produced such as represented by the perpendicular line 614. The dynamics of this wave are governed in part by the well known equation D sin θ=mλ, where λ is the wavelength, and m is an integer.

It is useful to consider the path length difference from a point before the scatterer 601a to the wavefront 614 of $N_{CG}D-N_{SD}D \sin\theta$, since the scattered waves originate from the same original wave 610. In this equation, $N_{CG}$ and $N_{SD}$ correspond to the refractive indices of the cross grating 102 and of a typical silicon dioxide layer covering the cross grating, respectively. Thus, the condition $N_{CG} D - N_{SD} D \sin \theta = m\lambda$, is relevant to the coherent wavefronts produced by the cross grating 102. Accordingly, the spacing D between two light scattering elements and the wavelength λ determines the angle θ of propagation of the resulting coherent wavefronts. The aforementioned condition for producing a coherent wavefront can also be expressed in terms of phases of the scattered waves as differing by multiples of 2 mπ radians at the wavefront.

It will be appreciated that the foregoing scattering principle can be extended into two dimensions, for example, along a direction (y) into the plane in FIG. 6. Thus, the scatterers 601a, b depicted in FIG. 6 can represent a cross-sectional view of a cross grating described herein where many light scattering elements are disposed longitudinally along an axis of propagation of cross grating 102. Furthermore, while the description above in reference to FIG. 6 relates to a scattering process from the line 602, coincident with the top of the substrate, the principle is also applicable to the reverse process where the scatterers receive the wave directed at an angle of θ and scatter light along the line 602.

Figure 7:
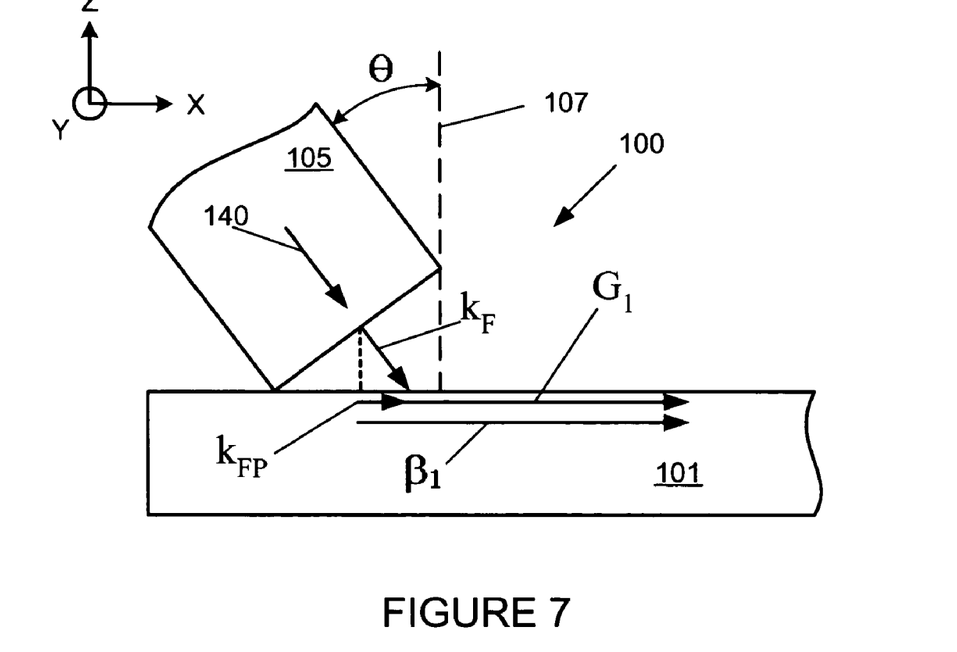
FIG. 7 is a side view of the wavevectors in one grating coupler of a PSGC, according to an embodiment of the present invention.

FIG. 7 is a side view, not to scale, of the wavevectors in one grating coupler of PSGC 100, according to an embodiment of the present invention. Optical waves are connected from optical fiber 105 by PSGC 100 to a waveguide disposed on the substrate 101. Fiber wavevector $k_F$ is incident on the light scattering elements of grating coupler 102 at an angle θ to the normal. Fiber wavevector $k_F$ projected onto the PSGC 100 is represented by the vector $k_{FP}$. Wavevector $\beta_1$ represents the wavevector of the waveguide along the x axis of the PSGC 100. Vector $G_1$ represents the grating in reciprocal space. The relationship between these vectors along the x axis is given by:

$$\beta_1 = k_{FP} + G_1 \qquad (1)$$

And along the y axis, the equation is:

$$\beta_2 = k_{FP} + G_2 \qquad (2)$$

or (1) and (2) combined together:

$$\beta_i = k_{FP} + G_i, \text{ where } i=1, 2 \qquad (3)$$

Figure 8:
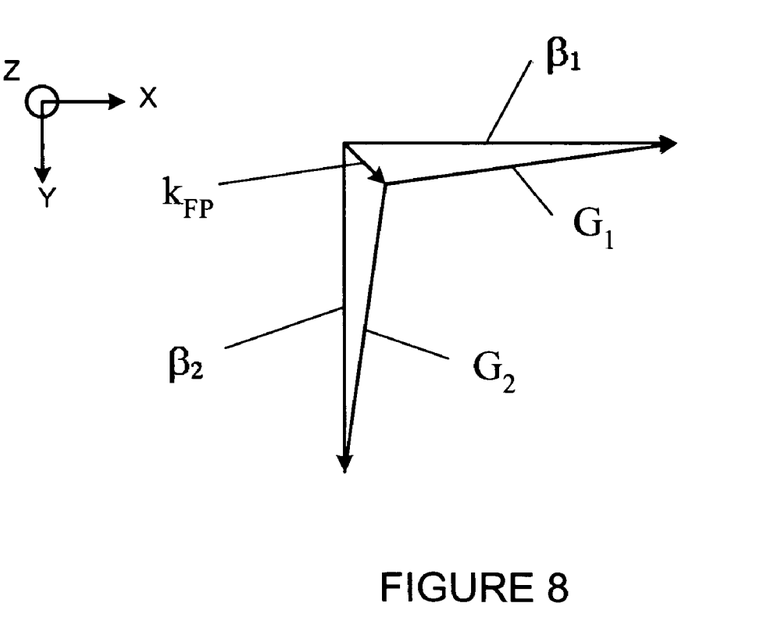
FIG. 8 schematically illustrates a vector analysis in the x-y plane of a PSGC, according to an embodiment of the present invention.

FIG. 8 schematically illustrates a vector analysis in the x-y plane of a PSGC, according to an embodiment of the present invention. The relationship between the vectors $\beta_1$, $k_{FP}$ and $G_1$ shown in a side view in FIG. 7, is shown in a top view of the x-y plane in FIG. 8. Since these three vectors are in the x-y plane, FIG. 8 provides a clearer view of the vectors.

There are three main parameters in the design of PSGC 100: determining the grating period, polarization selectivity and phase matching to a focusing guided wave.

The grating periodicity is determined by an evaluation of the k space selection rules for a PSGC 100. The incoming field's propagation angle with the normal 107 to the chip 101 is the angle θ. With a chosen fiber azimuth of 45 degrees, the fiber wavevector $k_F$ is given by the following equation:

$$k_F = n_F k_0 \times \left( \frac{\sin\theta}{\sqrt{2}} \frac{\sin\theta}{\sqrt{2}} - \cos\theta \right) \qquad (4)$$

where $n_F$ is the fiber index and $k_0$ is the wavevector of light. The magnitude of the wavevectors $\beta_1$ and $\beta_2$ in the waveguides along the x and y axes is given by the following equation:

$$|\beta_1| = |\beta_2| = k_0 n_{EFF} = \frac{2\pi}{\lambda} n_{EFF} \qquad (5)$$

where $n_{EFF}$ is the effective index of the waveguide. The wavevectors $\beta_1$ and $\beta_2$ are also referred to as the propagation constants for the waveguides. To achieve coupling between the wave from fiber 105 and an integrated waveguide, space can be considered in terms of reciprocal space, which is a concept used in crystallography. In reciprocal space, the grating can be represented by vectors $G_1$ and $G_2$ where equation (3) must be satisfied to achieve coupling.

The grating lattice vectors $a_1$ and $a_2$ can be deduced from the usual crystalline relationship:

$$a_i \cdot G_j = 2\pi \delta_{ij} \qquad (6)$$

where $\delta_{ij}$ is Kronecker's delta and i, j=1,2 so that $\delta_{ij}=1$ if i=j and $\delta_{ij}=0$ if i≠j.

In preferred embodiments, the angle θ is less than ten degrees and as a result, the magnitude of the wavevector $k_{FP}$ is very small compared to the magnitudes of the other vectors, and thus can be dropped from equation (3), which can be rewritten as:

$$|\beta_i| \cong |G_i|, \text{ where } i=1,2 \qquad (7)$$

Substituting for $\beta_i$ from equation (5) above and substituting for $G_i$ from equation (6) above, the result is:

$$|a_i| = \frac{\lambda}{n_{EFF}}, \text{ where } i = 1, 2 \qquad (8)$$

Equation (8) provides the grating period, also known as the distance between the rows 103 and 104 of light scattering elements 106 of PSGC 100. As discussed above, since $|k_{FP}|$ is very small, then equation (7) is a valid approximation, but the spatial positions of these vectors have to be considered, as is done graphically in FIG. 8. If vectors $\beta_1$ and $\beta_2$ are orthogonal, such as along the x and y axes, then vectors $G_1$ and $G_2$ are not orthogonal to each other. If vectors $G_1$ and $G_2$ are made orthogonal to each other, then vectors $\beta_1$ and $\beta_2$ are not orthogonal to each other.

Polarization selectivity by the PSGC 100 can be determined by an evaluation of coupling between the modes in the fiber and the modes in the waveguide. The k space selection rules, also known as the wavevector selection rules, discussed above can provide discrimination between the different modes in a waveguide by choosing the propagation constant to couple to. A "single mode" waveguide typically supports two modes, known as the transverse electric (TE) and transverse magnetic (TM). The TE and TM modes usually have different propagation constants, $\beta_{TE} \neq \beta_{TM}$ so that a grating designed according to equation (3) will couple to only one of these modes.

Using only the k space selection rules, there is no polarization selectivity, since both fiber polarization modes $E_1$ and $E_2$ have the same wavevector $k_F$ and can thus couple to both waveguides $\beta_1$ and $\beta_2$. The fiber polarization basis can be chosen as:

$$E_1 = \left( \frac{\cos\theta + 1}{2} \quad \frac{\cos\theta - 1}{2} \quad \frac{\sin\theta}{\sqrt{2}} \right) \qquad (9)$$

$$E_2 = \left( \frac{\cos\theta - 1}{2} \quad \frac{\cos\theta + 1}{2} \quad \frac{\sin\theta}{\sqrt{2}} \right) \qquad (10)$$

When the angle $\theta$ is small, $E_1$ is primarily along x and $E_2$ is primarily along y, as shown in FIG. 1. Thus modes $E_1$ and $E_2$ will primarily couple to waveguide modes of matching electric field orientation. Waveguide $\beta_1$ is waveguide 110 in FIG. 1 and it has its electric field in the x direction, and will primarily couple to mode $E_1$. Waveguide $\beta_2$ is waveguide 120 in FIG. 1 and it has its electric field in the y direction, and will primarily couple to mode $E_2$.

Polarization selectivity in this manner is not a selection rule, but a rule of thumb, and there could be some crosstalk. Crosstalk can occur for primarily two reasons. One reason is that each of the modes $E_1$ and $E_2$ are not exactly in alignment with the respective x and y axes. The second reason is that a guided wave in a waveguide grating is not a simple waveguide mode, but can be a much more complex Bloch wave with electric fields in all three directions.

Figure 9:
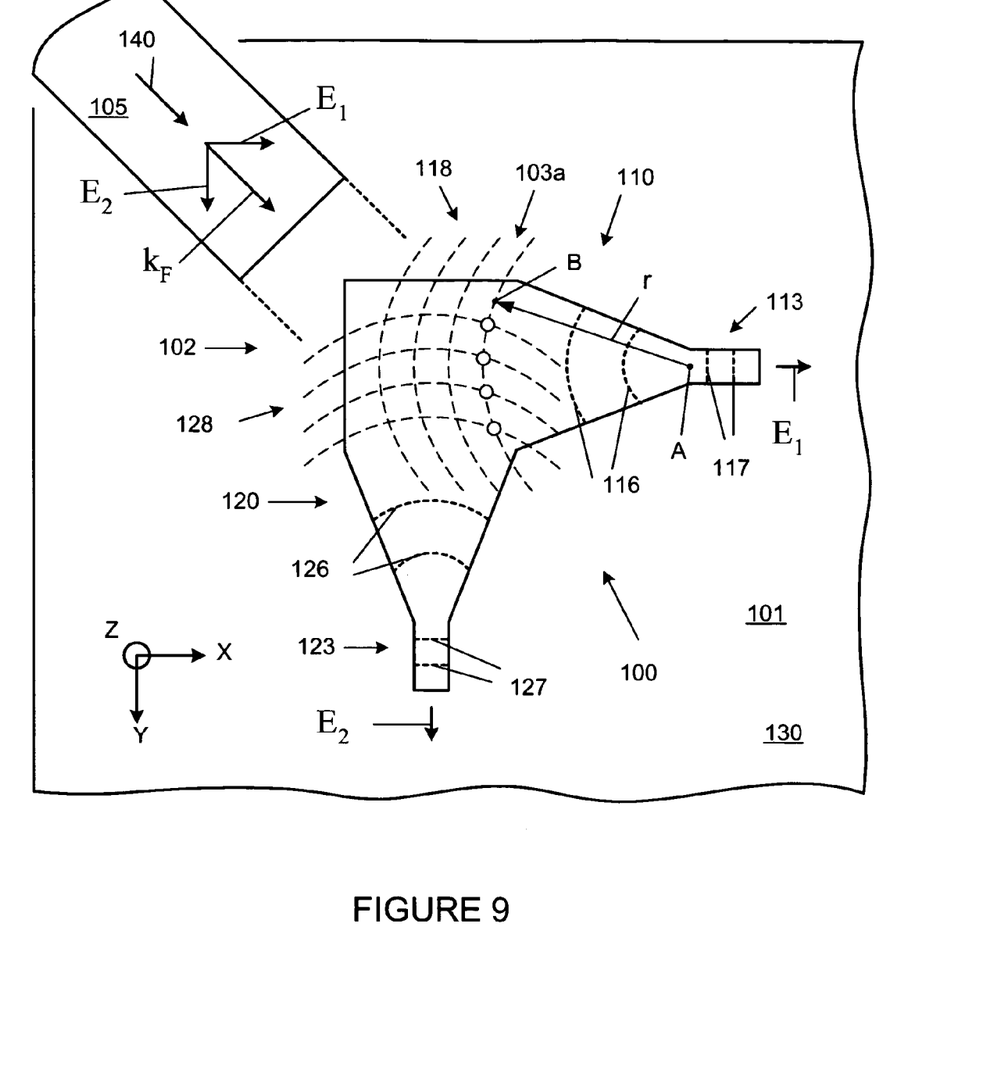
FIG. 9 schematically illustrates an analysis of a section of a PSGC, according to an embodiment of the present invention.

FIG. 9 schematically illustrates an analysis of a section of PSGC 100, which can be used to determine the shape of curved rows 103 and 104, according to an embodiment of the present invention. FIG. 9 shows a PSGC 100, with cross grating 102 with row 103a, flared waveguides 110 and 120 and linear waveguides 113 and 123. For the purpose of simplifying the diagram, only one row 103a of the rows 103 and 104 is shown in FIG. 9. Lines 116 and 126 represent circularly cylindrical wavefronts of light propagating through respective flared waveguides 110 and 120. Lines 117 and 127 represent planar wavefronts of light propagating through respective linear waveguides 113 and 123.

Cross grating 102 can be designed to focus one polarization of light in-plane to linear waveguide 113 via flared waveguide 110. The design of PSGC 100 can focus the other polarization of light to flared waveguide 120 and linear waveguide 123. Cross grating 102 along with flared waveguides 110 and 120 can be considered as focusing horns.

The curvature of rows 103 and 104, as shown in FIG. 1, is defined by respective curved lines 118 and 128. An analysis of a PSGC 100 with flared waveguide 110 can generate the set of curved lines 118, which provide the shape of the curved rows 103 of PSGC 100. Such an analysis is similarly applicable to flared waveguide 120, curved lines 128 and curved rows 104. The analysis presented is applicable to light propagating in either direction along either axis of propagation.

The phase map of the vector field expanding out of linear waveguide 113 from point A to point B is:

$$\phi_1(r) = \beta_1 |r - r_A| \qquad (11)$$

where r is an in-plane position in the grating coupler. The phase map has to be matched to the fiber mode profile:

$$\phi_F(r) = k_{FP} \cdot r \qquad (12)$$

yielding the following equation:

$$\phi_1(r) = \phi_F(r) + 2m\pi \qquad (13)$$

where m is an integer. Equation 13 yields a family of ellipses with one of two foci at the input point A. A similar group of ellipses can be derived for the other waveguides 120 and 123. A group of ellipses based on a pair of foci with the same shape and cross sectional proportions are known as concentric homothetic ellipses. Equation 13 can be used to generate such a group of ellipses.

Curved lines 118 are segments of equally spaced concentric homothetic elliptical curves as determined by equation 13 above for flared waveguide 110. Similarly, curved lines 128 are segments of equally spaced concentric homothetic elliptical curves as determined by equation 13 above for flared waveguide 120. The intersection of the two sets of curved lines 118 and 128 determines the location of light scattering elements 106, which include rows 103 and 104. The cross grating 102 is fabricated by placing light scattering elements such as pillars or by etching holes at the intersection of any two of the sets of ellipses, as shown in FIG. 9.

The curved grating rows can be a source of crosstalk because the elliptical curvature of the phase fronts can introduce small components of the electric field of the in-plane waves.

In addition to the three main design parameters discussed above, there are other design parameters that one skilled in the art will be cognizant of and can be taken into consideration in the overall design of a PSGC. These parameters include: sizing and placement of the grating coupler with respect to the optical fiber in order to minimize the scattering of light out of any unilluminated light scattering elements which are not receiving light from the fiber. There is an optimum distance from the fiber core to the grating edge in both dimensions.

The periodicity and size and shape of the light scattering elements 106 can be modified to account for other phenomenon. Complex higher order effects, such as those caused by Bloch waves, can be considered to improve efficiency. The introduction of light scattering holes can decrease the effective index of the waveguide in the grating coupler, which can result in an increase in the grating period as compared to the grating period computed using the standard waveguide propagation constant $\beta$.

The shapes and sizes of the holes or pillars used as light scattering elements can be non-homogeneous, and they can be engineered to increase coupling efficiency and reduce crosstalk. Holes with different scattering cross sections in different directions, such as elongated holes, may be useful in some applications. The desired shape of the holes as compared to what is possible given the available fabrication techniques should also be taken into account during the design process. A square hole will typically be fabricated with rounded corners. A square hole with angular corners, could be made using a process such as optical proximity correction.

The eccentricity of the ellipses can be modified to account for the propagation constant mismatch between the grating and the flared waveguide. The curved rows can be designed as non-elliptic. The angle between the two flared waveguides can be non-orthogonal to try to reduce the crosstalk.

The layers within the structure of the grating coupler can be modified to increase efficiency. The waveguide in the grating coupler can include multiple high index layers. For example, the waveguide can include two high index layers, one of which is patterned while the other is not. Multiple layers can be patterned to form a multi-layered grating coupler.

Distributed Bragg Reflectors (DBR) can also be fabricated below and/or above the grating coupler to enhance the efficiency of the grating. A single dielectric interface below the grating could block the absorption of some light into the substrate. A microcavity could improve the efficiency of a PSGC by using various elements such as: anti-reflection layers, buried mirrors, DBRs and other layers above and below the grating.

The design process for optical paths comprises construction of maskworks. Maskworks include shapes, layout, data structures, netlists, and alignment marks and other elements of the design which are typically stored as digital data on a computer system. In addition, these electronic representations of the designs are transferred to a set of many physical masks which are used during the fabrication of the components. These many masks are included in the definition of maskworks.

A particularly advantageous aspect of the present invention is that a PSGC can connect an optical signal to an optoelectronic integrated circuit. A PSGC splits the optical input signal into two orthogonal polarizations and connects the two polarizations to separate waveguides on the integrated circuit. The two polarizations can be processed by separate signal processing systems. These signal processing systems can process the two polarizations in an identical or non-identical manner, as needed for a particular application.

Although the present invention has been described in detail, it should be understood that various changes, substitutions and alterations can be made without departing from the spirit and scope of the invention.

We claim:

1. An optical apparatus disposed on a substrate, comprising:
   a waveguide comprising:
      a grating coupler and
      first and second flared waveguides with respective first and second ports,
   where the grating coupler has a non-planar port that is not in the plane of the substrate, and
   the first and second ports are in the plane of the substrate,
   where each of the first and second flared waveguides has:
      a relatively wide end,
      a relatively narrow end that comprises the port, and
      at least one substantially hyperbolically curved sidewall,
   where the relatively wide end of each of the first and second flared waveguides is coupled to the grating coupler.

2. The optical apparatus according to claim 1, and further comprising receiving light coupled to the non-planar port,
   where the integrated optical apparatus splits orthogonal polarization components of the received light into first and second light outputs directed to the respective first and second ports.

3. The optical apparatus according to claim 1, and further comprising receiving first and second light inputs coupled to the respective first and second ports,
   where the integrated optical apparatus couples the received first and second light inputs to respective first and second orthogonal polarization components of a light output directed to the non-planar port.

4. The optical apparatus according to claim 1, and further comprising first and second waveguides coupled to the narrow ends of respective first and second flared waveguides.

5. The optical apparatus according to claim 1, wherein at least one of the first and second flared waveguides is selected from a group comprising: a strip loaded waveguide, a channel waveguide, a rib waveguide and a ridge waveguide.

6. The optical apparatus according to claim 5, wherein the strip loaded waveguide comprises a strip, a slab and a low index transition layer between the strip and the slab.

7. The optical apparatus according to claim 1, wherein at least one of the flared waveguides has two substantially hyperbolically curved sidewalls,
   where the two curved sidewalls support the guided propagation of circularly cylindrical wavefronts in the flared waveguide.

8. The optical apparatus according to claim 1, wherein
   the non-planar port propagates light with substantially planar wavefronts, the first and second flared waveguides propagate light with non-planar wavefronts and
   the relatively narrow ends of first and second flared waveguides propagate light with planar wavefronts, and
   where the plurality of light scattering elements convert light between planar wavefronts and non-planar wavefronts, and
   the relatively narrow ends of the first and second flared waveguides convert light between non-planar wavefronts and planar wavefronts.

9. The optical apparatus according to claim 1, wherein
   the non-planar port propagates light with substantially non-planar wavefronts, the first and second flared waveguides propagate light with non-planar wavefronts and
   the relatively narrow ends of first and second flared waveguides propagate light with planar wavefronts, and
   where the plurality of light scattering elements propagate light with non-planar wavefronts, and the relatively narrow ends of the first and second flared waveguides convert light between non-planar wavefronts and planar wavefronts.

10. The optical apparatus according to claim 1, wherein the grating coupler is comprised of a plurality of light scattering elements arranged in a plurality of curved rows.

11. The optical apparatus according to claim 10, wherein the plurality of light scattering elements are positioned at a plurality of points defined by a plurality of intersections of first and second pluralities of curved lines.

12. The optical apparatus according to claim 11, wherein the plurality of light scattering elements are arranged in first and second pluralities of curved rows aligned with the respective first and second pluralities of curved lines.

13. The optical apparatus according to claim 11, wherein each of the first plurality of curved lines is comprised of a respective one of a plurality of substantially concentric homothetic elliptical curves defined by a first pair of foci, and each of the second plurality of curved lines is comprised of a respective one of a plurality of substantially concentric homothetic elliptical curves defined by a second pair of foci.

14. The optical apparatus according to claim 11, wherein the spacing between the curves of the first plurality of curved lines is substantially uniform, and the spacing between the curves of the second plurality of curved lines is substantially uniform.

15. The optical apparatus according to claim 11, wherein a minority of the plurality of light scattering elements are not positioned at the plurality of points defined by the plurality of intersections of first and second pluralities of curved lines.

16. The optical apparatus according to claim 11, wherein a minority of the plurality of light scattering elements are positioned at points in between the plurality of points defined by the plurality of intersections of first and second pluralities of curved lines.

17. The optical apparatus according to claim 10, wherein at least one of the plurality of light scattering elements is selected from a group comprising: semiconductor materials, dielectric materials and a structure comprised of at least one semiconductor layer and at least one dielectric layer.

18. The optical apparatus according to claim 10, wherein the shape of at least one of the plurality of light scattering elements is selected from a group comprising: a hole, a cylinder, a pillar, a conic section, a cube, a pyramid, a prism and a polyhedron.

19. The optical apparatus according to claim 10, wherein at least one of the plurality of curved rows is comprised of a set of light scattering elements of various sizes, where a variation in one of the dimensions of the set of light scattering elements is selected from a group comprising: periodic, linear, and as defined by a non-linear mathematical function.

20. The optical apparatus according to claim 10, wherein at least one characteristic of the plurality of light scattering elements varies irregularly in magnitude, where the varying characteristic is selected from the group comprising: width, height, length, spacing, depth and index of refraction.

21. The optical apparatus according to claim 1, wherein the plurality of light scattering elements are arranged in first and second pluralities of curved rows, where at least one of the first plurality of curved rows intersects with at least one of the second plurality of second rows, each of the plurality of light scattering elements is positioned in both the first and second pluralities of curved rows, the first plurality of curved rows has a shaped concave side facing the first port, and the second plurality of curved rows has a shaped concave side facing the second port.

22. The optical apparatus according to claim 21, wherein the spacing between the rows of the first plurality of curved rows is substantially uniform, and the spacing between the rows of the second plurality of curved rows is substantially uniform.

23. The optical apparatus according to claim 21, wherein the curvatures of the first plurality of curved rows are defined by a first plurality of substantially elliptical paths defined by a first pair of foci, and the curvatures of the second plurality of curved rows are defined by a second plurality of substantially elliptical paths defined by a second pair of foci.

24. The optical apparatus according to claim 23, wherein the curvatures of the first plurality of curved rows are defined by a first plurality of segments of a respective first plurality of substantially concentric homothetic elliptical curves defined by a first pair of foci, and the curvatures of the second plurality of curved rows are defined by a second plurality of segments of a respective second plurality of substantially concentric homothetic elliptical curves defined by a second pair of foci.

25. The optical apparatus according to claim 1, wherein at least one of the plurality of curved rows has a substantially elliptically shaped concave side facing the first port, and at least one other of the plurality of curved rows has a substantially elliptically shaped concave side facing the second port.

26. The optical apparatus according to claim 1, wherein the non-planar port couples an optical signal between an optical element and the integrated optical apparatus.

27. The optical apparatus according to claim 26, wherein the optical element is selected from a group comprising: an optical fiber, a laser, a lens, a light emitting diode, a photodetector, and a grating coupler.

28. The optical apparatus according to claim 27, wherein the optical fiber comprises single mode fiber.

29. The optical apparatus according to claim 28, wherein the plurality of light scattering elements are positioned substantially within the Rayleigh range of the end of the optical fiber.

30. The optical apparatus according to claim 27, wherein the optical element is positioned substantially in the near field of the plurality of light scattering elements.

31. The optical apparatus according to claim 27, wherein the optical element is positioned in proximity to the plurality of light scattering elements, and where the plurality of light scattering elements is substantially within the near field of the optical element.

32. The optical apparatus according to claim 1, wherein the axis of propagation of the second port is substantially orthogonal with respect to the axis of propagation of the first port.

33. The optical apparatus according to claim 1, wherein the axis of propagation of the non-planar port is less than ten degrees with respect to the normal to the surface of the substrate.

34. The optical apparatus according to claim 1, wherein the substrate is selected from the group comprising: silicon, silicon on insulator (SOI), silicon on sapphire (SOS), silicon on nothing (SON) and a first layer of monocrystalline silicon,
a second layer of dielectric material disposed on the first layer,
a third layer of monocrystalline silicon disposed on the second layer,
a fourth layer of dielectric material disposed on the third layer,
a fifth layer of monocrystalline silicon disposed on the fourth layer.

35. The optical apparatus according to claim 1, and further comprising at least one reflector of at least one layer disposed in at least one of the following configurations with respect to the integrated optical apparatus: on top, on the substrate below, and on top and also on the substrate below.

36. The optical apparatus according to claim 1, and further comprising an anti-reflective coating over the integrated optical apparatus.

37. The optical apparatus according to claim 1, and further comprising a maskwork for fabricating the integrated optical apparatus.

* * * * *